(12) United States Patent
Ciuc et al.

(10) Patent No.: US 7,868,922 B2
(45) Date of Patent: Jan. 11, 2011

(54) FOREGROUND/BACKGROUND SEGMENTATION IN DIGITAL IMAGES

(75) Inventors: Mihai Ciuc, Bucharest (RO); Adrian Zamfir, Bucharest (RO); Adrian Capata, Bucharest (RO); Peter Corcoran, Claregalway (IE); Eran Steinberg, San Francisco, CA (US)

(73) Assignee: Tessera Technologies Ireland Limited, Galway (IE)

( * ) Notice: Subject to any disclaimer, the term of this patent is extended or adjusted under 35 U.S.C. 154(b) by 258 days.

(21) Appl. No.: 11/573,713

(22) PCT Filed: Aug. 21, 2006

(86) PCT No.: PCT/EP2006/008229

§ 371 (c)(1),
(2), (4) Date: Feb. 14, 2007

(87) PCT Pub. No.: WO2007/093199

PCT Pub. Date: Aug. 23, 2007

(65) Prior Publication Data

US 2009/0273685 A1    Nov. 5, 2009

Related U.S. Application Data

(60) Provisional application No. 60/773,714, filed on Feb. 14, 2006.

(51) Int. Cl.
*H04N 5/232* (2006.01)

(52) U.S. Cl. .................................................. 348/222.1

(58) Field of Classification Search ............... 348/222.1
See application file for complete search history.

(56) References Cited

U.S. PATENT DOCUMENTS

| 4,683,496 | A | 7/1987 | Tom |
| 5,046,118 | A | 9/1991 | Ajewole et al. |
| 5,063,448 | A | 11/1991 | Jaffray et al. |
| 5,086,314 | A | 2/1992 | Aoki et al. |
| 5,109,425 | A | 4/1992 | Lawton |

(Continued)

FOREIGN PATENT DOCUMENTS

EP    1367538 A2    12/2003

(Continued)

OTHER PUBLICATIONS

Final Office Action mailed Sep. 18, 2009, for U.S. Appl. No. 11/319,766 filed Dec. 27, 2005.

(Continued)

*Primary Examiner*—Sinh Tran
*Assistant Examiner*—Mark Monk
(74) *Attorney, Agent, or Firm*—Andrew V. Smith (57) ABSTRACT

An implementation efficient method of distinguishing between foreground and background regions of a digital image of a scene includes capturing two images of nominally the same scene and storing the captured images in DCT-coded format. The first image is taken with the foreground more in focus than the background and the second image is taken with the background more in focus than the foreground. Regions of the first image are assigned as foreground or background according to whether the sum of selected higher order DCT coefficients decreases or increases for the equivalent regions of the second image.

40 Claims, 3 Drawing Sheets

U.S. PATENT DOCUMENTS

| | | |
|---|---|---|
| 5,130,935 A | 7/1992 | Takiguchi |
| 5,164,993 A | 11/1992 | Capozzi et al. |
| 5,329,379 A | 7/1994 | Rodriguez et al. |
| 5,500,685 A | 3/1996 | Kokaram |
| 5,504,846 A | 4/1996 | Fisher |
| 5,534,924 A | 7/1996 | Florant |
| 5,594,816 A | 1/1997 | Kaplan et al. |
| 5,621,868 A | 4/1997 | Mizutani et al. |
| 5,724,456 A | 3/1998 | Boyack et al. |
| 5,812,787 A | 9/1998 | Astle |
| 5,844,627 A | 12/1998 | May et al. |
| 5,878,152 A | 3/1999 | Sussman |
| 5,880,737 A | 3/1999 | Griffin et al. |
| 5,949,914 A | 9/1999 | Yuen |
| 5,990,904 A | 11/1999 | Griffin |
| 6,005,959 A | 12/1999 | Mohan et al. |
| 6,008,820 A | 12/1999 | Chauvin et al. |
| 6,018,590 A | 1/2000 | Gaborski |
| 6,061,476 A | 5/2000 | Nichani |
| 6,069,635 A | 5/2000 | Suzuoki et al. |
| 6,069,982 A | 5/2000 | Reuman |
| 6,122,408 A | 9/2000 | Fang et al. |
| 6,198,505 B1 | 3/2001 | Turner et al. |
| 6,240,217 B1 | 5/2001 | Ercan et al. |
| 6,243,070 B1 | 6/2001 | Hill et al. |
| 6,292,194 B1 | 9/2001 | Powell, III |
| 6,326,964 B1 | 12/2001 | Snyder et al. |
| 6,407,777 B1 | 6/2002 | DeLuca |
| 6,483,521 B1 | 11/2002 | Takahashi et al. |
| 6,526,161 B1 | 2/2003 | Yan |
| 6,535,632 B1 | 3/2003 | Park et al. |
| 6,538,656 B1 | 3/2003 | Cheung et al. |
| 6,577,762 B1 | 6/2003 | Seeger et al. |
| 6,577,821 B2 | 6/2003 | Malloy Desormeaux |
| 6,593,925 B1 | 7/2003 | Hakura et al. |
| 6,631,206 B1 | 10/2003 | Cheng et al. |
| 6,670,963 B2 | 12/2003 | Osberger |
| 6,678,413 B1 | 1/2004 | Liang et al. |
| 6,683,992 B2 | 1/2004 | Takahashi et al. |
| 6,744,471 B1 | 6/2004 | Kakinuma et al. |
| 6,756,993 B2 | 6/2004 | Popescu et al. |
| 6,781,598 B1 | 8/2004 | Yamamoto et al. |
| 6,803,954 B1 | 10/2004 | Hong et al. |
| 6,804,408 B1 | 10/2004 | Gallagher et al. |
| 6,836,273 B1 | 12/2004 | Kadono |
| 6,842,196 B1 | 1/2005 | Swift et al. |
| 6,850,236 B2 | 2/2005 | Deering |
| 6,930,718 B2 | 8/2005 | Parulski et al. |
| 6,952,225 B1 | 10/2005 | Hyodo et al. |
| 6,956,573 B1 | 10/2005 | Bergen et al. |
| 6,987,535 B1 | 1/2006 | Matsugu et al. |
| 6,989,859 B2 | 1/2006 | Parulski |
| 6,990,252 B2 | 1/2006 | Shekter |
| 7,013,025 B2 | 3/2006 | Hiramatsu |
| 7,035,477 B2 | 4/2006 | Cheatle |
| 7,042,505 B1 | 5/2006 | DeLuca |
| 7,054,478 B2 | 5/2006 | Harman |
| 7,064,810 B2 | 6/2006 | Anderson et al. |
| 7,081,892 B2 | 7/2006 | Alkouh |
| 7,102,638 B2 | 9/2006 | Raskar et al. |
| 7,103,227 B2 | 9/2006 | Raskar et al. |
| 7,103,357 B2 | 9/2006 | Kirani et al. |
| 7,149,974 B2 | 12/2006 | Girgensohn et al. |
| 7,206,449 B2 | 4/2007 | Raskar et al. |
| 7,218,792 B2 | 5/2007 | Raskar et al. |
| 7,295,720 B2 | 11/2007 | Raskar |
| 7,317,843 B2 | 1/2008 | Sun et al. |
| 7,359,562 B2 | 4/2008 | Raskar et al. |
| 7,394,489 B2 | 7/2008 | Yagi |
| 7,469,071 B2 | 12/2008 | Drimbarean et al. |
| 2001/0000710 A1 | 5/2001 | Queiroz et al. |
| 2001/0012063 A1 | 8/2001 | Maeda |
| 2002/0028014 A1 | 3/2002 | Ono |
| 2002/0080261 A1 | 6/2002 | Kitamura et al. |
| 2002/0093670 A1 | 7/2002 | Luo et al. |
| 2002/0191860 A1 | 12/2002 | Cheatle |
| 2003/0038798 A1 | 2/2003 | Besl et al. |
| 2003/0052991 A1 | 3/2003 | Stavely |
| 2003/0091225 A1 | 5/2003 | Chen |
| 2003/0103159 A1 | 6/2003 | Nonaka |
| 2003/0169944 A1 | 9/2003 | Dowski et al. |
| 2003/0184671 A1 | 10/2003 | Robins et al. |
| 2004/0047513 A1 | 3/2004 | Kondo et al. |
| 2004/0145659 A1 | 7/2004 | Someya et al. |
| 2004/0201753 A1 | 10/2004 | Kondo et al. |
| 2004/0208385 A1 | 10/2004 | Jiang |
| 2004/0223063 A1 | 11/2004 | DeLuca et al. |
| 2005/0017968 A1 | 1/2005 | Wurmlin et al. |
| 2005/0031224 A1 | 2/2005 | Prilutsky et al. |
| 2005/0041121 A1 | 2/2005 | Steinberg et al. |
| 2005/0058322 A1 | 3/2005 | Farmer et al. |
| 2005/0140801 A1 | 6/2005 | Prilutsky et al. |
| 2005/0213849 A1 | 9/2005 | Kreang-Arekul et al. |
| 2005/0243176 A1 | 11/2005 | Wu et al. |
| 2005/0271289 A1 | 12/2005 | Rastogi |
| 2006/0008171 A1 | 1/2006 | Petschnigg et al. |
| 2006/0039690 A1 | 2/2006 | Steinberg et al. |
| 2006/0104508 A1 | 5/2006 | Daly et al. |
| 2006/0153471 A1 | 7/2006 | Lim et al. |
| 2006/0181549 A1 | 8/2006 | Alkough |
| 2006/0193509 A1 | 8/2006 | Criminisi et al. |
| 2007/0237355 A1 | 10/2007 | Song et al. |

FOREIGN PATENT DOCUMENTS

| | | |
|---|---|---|
| JP | 02281879 | 11/1990 |
| JP | 04-127675 | 4/1992 |
| JP | 06-014193 | 1/1994 |
| JP | 08-223569 | 8/1996 |
| JP | 10-285611 | 10/1998 |
| JP | 2000-102040 | 4/2000 |
| JP | 2000-299789 | 10/2000 |
| JP | 2001-101426 | 4/2001 |
| JP | 2001-223903 | 8/2001 |
| JP | 22112095 A2 | 4/2002 |
| JP | 2003-281526 | 10/2003 |
| JP | 24064454 A2 | 2/2004 |
| JP | 2004-166221 | 6/2004 |
| JP | 2004-185183 | 7/2004 |
| JP | 26024206 A2 | 1/2006 |
| JP | 2006-080632 | 3/2006 |
| JP | 26140594 A2 | 6/2006 |
| WO | WO-9426057 A1 | 11/1994 |
| WO | WO-02052839 A2 | 7/2002 |
| WO | WO-02089046 A1 | 11/2002 |
| WO | WO-2004017493 A1 | 2/2004 |
| WO | WO-2004036378 A2 | 4/2004 |
| WO | WO-2004059574 A2 | 7/2004 |
| WO | WO-2005015896 A1 | 2/2005 |
| WO | WO-2005076217 A2 | 8/2005 |
| WO | WO-2005099423 A2 | 10/2005 |
| WO | WO-2005101309 A1 | 10/2005 |
| WO | WO-2007025578 A1 | 3/2007 |
| WO | WO-2007073781 A1 | 7/2007 |
| WO | WO 2007/093199 A2 | 8/2007 |
| WO | WO-2007095477 A2 | 8/2007 |

OTHER PUBLICATIONS

Non-Final Office Action mailed Mar. 31, 2010, for U.S. Appl. No. 11/744,020 filed May 3, 2007.

Notification of Transmittal of the International Search Report and the Written Opinion of the International Searching Authority, or the Declaration for PCT application No. PCT/EP2006/008229, dated Jan. 14, 2008, 18 pages.

Favaro P: "Depth from Focus/Defocus" Internet Citation, [Online] (Jun. 25, 2002) XP002398665 Retrieved from the Internet: URL:http://homepages.inf.ed.ac.uk/rbf> [retrieved on Sep. 12, 2006] cited in the application the whole document.

PCT Notification of Transmittal of the International Search Report and the Written Opinion of the International Searching Authority, for the Declaration, PCT/US07/61956, dated Mar. 14, 2008, 9 pages.

Hailin Jin and Paolo Favaro, "A Variational Approach to Shape from Defocus", {ECCV} (2), pp. 18-30, 2002. http://citeseer.ist.psu.edu/554899.html.

Kunitoshi Komatsu and Kaoru Sezaki, "Design of Lossless Block Transforms and Filter Banks for Image Coding", http://citeseer.ist.psu.edu/komatsu99design.html, 1999.

Leubner, Christian, "Multilevel Image Segmentation in Computer-Vision Systems", http://citeseer.ist.psu.edu/565983.html.

Li, S., Kwok, J. T., and Wang, Y., "Multifocus image fusion using artificial neural networks", Pattern Recogn. Lett. 23, 8 (Jun. 2002), 985-997. DOI= http://dx.doi.org/10.1016/S0167-8655(02)00029-6.

Mcguire, M., Matusik, W., Pfister, H., Hughes, J. F., and Durand, F., "Defocus video matting", ACM Trans. Graph. 24, 3 (Jul. 2005), 567-576. DOI= http://doi.acm.org/10.1145/1073204.1073231.

Pavlidis Tsompanopoulos Papamarkos, "A Multi-Segment Residual Image Compression Technique" http://citeseer.ist.psu.edu/554555.html.

Rajagopalan, A.N. and Chaudhuri, S., "Optimal recovery of depth from defocused images using an mrf model" In Proc. International Conference on Computer Vision, pp. 1047-1052, 1998, http://citeseer.ist.psu.edu/rajagopalan98optimal.html.

Reinhard, E. and Khan, E. A., "Depth-of-field-based alpha-matte extraction." In Proceedings of the 2nd Symposium on Applied Perception in Graphics and Visualization (A Coruña, Spain, Aug. 26-28, 2005). APGV '05, vol. 95. ACM Press, New York, NY, 95-102. DOI= http://doi.acm.org/10.1145/1080402.1080419.

Y. Y. Schechner, N. Kiryati and R. Basri, "Separation of transparent layers using focus," Proc. ICCV, pp. 1061-1066, 1998. http://citeseer.ist.psu.edu/article/schechner98separation.html.

M. Subbarao and G. Surya, "Depth from Defocus: A Spatial Domain Approach", Technical Report No. 92.12.03, Computer Vision Laboratory, Electrical Engineering Department, SUNY, Stony Brook, NY. http://citeseer.ist.psu.edu/subbarao94depth.html.

Murali Subbarao and Jenn-Kwei Tyan, "Noise Sensitivity Analysis of Depth-from-Defocus by a Spatial-Domain Approach", http://citeseer.ist.psu.edu/subbarao97noise.html.

C. Swain and T. Chen. "Defocus-based image segmentation" In Proceedings ICASSP-95, vol. 4, pp. 2403-2406, Detroit, MI, May 1995, IEEE, http://citeseer.ist.psu.edu/swain95defocusbased.html, Sun, J., Li, Y., Kang, S. B., and Shum, H. 2006. "Flash matting." in ACM SIGGRAPH 2006 Papers (Boston, Massachusetts, Jul. 30-Aug. 3, 2006). SIGGRAPH '06. ACM Press, New York, NY, 772-778. DOI= http://doi.acm.org/10.1145/1179352.1141954.

D. Ziou and F. Deschenes, "Depth from Defocus Estimation in Spatial Domain", CVIU, vol. 81, No. 2, pp. 143-165, 2001. http://citeseer.ist.psu.edu/ziou99depth.html.

Adelson, E.H., "Layered Representations for Image Coding, http://web.mit.edu/persci/people/adelson/pub.sub.--pdfs/layers91.pdf.", Massachusetts Institute of Technology, 1991, 20 pages.

Aizawa, K. et al., "Producing object-based special effects by fusing multiple differently focused images, http://rlinks2.dialog.com/NASApp/ChannelWEB/DialogProServlet?ChName=engineering", IEEE transactions on circuits and systems for video technology, 2000, pp. 323-330, vol. 10-Issue 2.

Ashikhmin, Michael, "A tone mapping algorithm for high contrast images, http://portal.acm.org/citation.cfm?id=581 916and,coll=Portalanddl=ACMandCFID=1 7220933andCFTOKEN=89149269", ACM International Conference Proceeding Series, Proceedings of the 13th Eurographics workshop on Rendering, 2002, pp. 145-156, vol. 28.

Barreiro, R.B. et al., "Effect of component separation on the temperature distribution of the cosmic microwave background, Monthly Notices of The Royal Astronomical Society, Current Contents Search®. Dialog® File No. 440 Accession No. 23119677", 2006, pp. 226-246, vol. 368-Issue 1.

Beir, Thaddeus, "Feature-Based Image Metamorphosis," In Siggraph '92, Silicon Graphics Computer Systems, 2011 Shoreline Blvd, Mountain View CA 94043, http://www.hammerhead.com/thad/thad.html. cited by other.

Benedek, C. et al., "Markovian framework for foreground-background-shadow separation of real world video scenes, Proceedings v 3851 LNCS 2006, Ei Compendex®. Dialog® File No. 278 Accession No. 11071345", 7th Asian Conference on Computer Vision, 2006.

Boutell, M. et al., "Photo classification by integrating image content and camera metadata", Pattern Recognition, Proceedings of the 17th International Conference, 2004, pp. 901-904, vol. 4.

Braun M. et al., "Information Fusion of Flash and Non-Flash Images, retrieved from the Internet:URL: http://graphics.stanford.edu/{georgp/vision.htm", 2002, pp. 1-12.

Chen, Shenchang et al., "View interpolation for image synthesis, ISBN:0-89791-601-8, http://portal.acm.org/citation.cfm?id=166153andcoli=GUIDEanddI=GUIDEandCFID=680-9268andCFTOKEN=82843223.", International Conference on Computer Graphics and Interactive Techniques, Proceedings of the 20th annual conference on Computer graphics and interactive techniques, 1993, pp. 279-288, ACM Press.

Eissemann, E. et al., "Flash Photography Enhancement via Intrinsic Relighting, ACM Transactions on URL: http://graphics.stanford.edu/{georgp/vision.htm", 2002, pp. 1-12.

Eriksen, H.K. et al., "Cosmic microwave background component separation by parameter estimation, Inspec. Dialog® File No. 2 Accession No. 9947674", Astrophysical Journal, 2006, pp. 665-682, vol. 641-Issue 2.

European Patent Office, Communication pursuant to Article 94(3) EPC for EP Application No. 06776529.7, dated Jan. 30, 2008, 3 pages.

European Patent Office, extended European Search Report for EP application No. 07024773.9, dated Jun. 3, 2008, 5 pages.

European Patent Office, extended European Search Report for EP application No. 07756848.3, dated May 27, 2009, 4 pages.

Final Office Action mailed Feb. 4, 2009, for U.S. Appl. No. 11/319,766, filed Dec. 27, 2005.

Final Office Action mailed Jun. 24, 2009, for U.S. Appl. No. 11/744,020, filed May 3, 2007.

Haneda, E., "Color Imaging XII: Processing, Hardcopy, and Applications", Proceedings of Society of Optical Engineers, 2007, vol. 6493.

Hashi Yuzuru et al., "A New Method to Make Special Video Effects. Trace and Emphasis of Main Portion of Images, Japan Broadcasting Corp., Sci. and Techical Res. Lab., JPN, Eizo Joho Media Gakkai Gijutsu Hokoku, http://rlinks2.dialog.com/NASApp/ChannelWEB/DialogProServlet?ChName=engineering", 2003, pp. 23-26, vol. 27.

Heckbert, Paul S., "Survey of Texture Mapping, http://citeseer.ist.psu.edu/135643.html", Proceedings of Graphics Interface '86. IEEE Computer Graphics and Applications, 1986, pp. 56-67 and 207-212.

Homayoun Kamkar-Parsi, A., "A multi-criteria model for robust foreground extraction, http://portal.acm.org/citation.cfm?id=1099410andcoll=Porialanddl=ACMandCFID=17220933andCFTOKEN=89149269", Proceedings of the third ACM international workshop on Video surveillance and sensor networks, 2005, pp. 67-70, ACM Press.

Jin, J., "Medical Imaging, Image Processing, Murray H. Loew, Kenneth M. Hanson, Editors", Proceedings of SPIE, 1996, pp. 864-868, vol. 2710.

Kelby, Scott, "Photoshop Elements 3: Down and Dirty Tricks, ISBN: 0-321-27835-6, One Hour Photo: Portrait and studio effects", 2004, Chapter 1, Peachpit Press.

Kelby, Scott, "The Photoshop Elements 4 Book for Digital Photographers, XP002406720, ISBN: 0-321-38483-0, Section: Tagging Images of People (Face Tagging)", 2005, New Riders.

Khan, E.A., "Image-based material editing, http://portal.acm.org/citation.cfm?id=1141937andcoll=GUIDEanddl=GUIDEandCFID=68-09268andCFTOKEN=82843223", International Conference on Computer Graphics and Interactive Techniques, 2006, pp. 654 663, ACM Press.

Leray et al., "Spatially distributed two-photon excitation fluorescence in scattering media: Experiments and timeresolved Monte Carlo simulations", Optics Communications, 2007, pp. 269-278, vol. 272-Issue 1.

Li, Han et al., "A new model of motion blurred images and estimation of its parameter", Acoustics, Speech, and Signal Processing, IEEE International Conference on ICASSP '86, 1986, pp. 2447-2450, vol. 11.

Li, Liyuan et al., "Foreground object detection from videos containing complex background, http//portaLacm.org/citation. cfm?id=957017andcoll= Portalanddl=ACMandCFI D=17220933andCFTCKE N=89149269", Proceedings of the eleventh ACM international conference on Multimedia, 2003, pp. 2-10, ACM Press.

Neri, A. et al., "Automatic moving object and background separation Ei Compendex®. Dialog® File No. 278 Accession No. 8063256", Signal Processing, 1998, pp. 219-232, vol. 66-Issue 2.

Non-Final Office Action mailed Aug. 6, 2008, for U.S. Appl. No. 11/319,766, filed Dec. 27, 2005.

Non-Final Office Action mailed Jul. 13, 2009, for U.S. Appl. No. 11/421,027, filed May 30, 2006.

Non-Final Office Action mailed Mar. 10, 2009, for U.S. Appl. No. 11/217,788, filed Aug. 30, 2005.

Non-Final Office Action mailed Nov. 25, 2008, for U.S. Appl. No. 11/217,788, filed Aug. 30, 2005.

Non-Final Office Action mailed Sep. 11, 2008, for U.S. Appl. No. 11/744,020, filed May 3, 2007.

Office Action in co-pending European Application No. 06 776 529. 7-2202, entitled "Communication Pursuant to Article 94(3) EPC", dated Sep. 30, 2008, 3 pages.

Owens, James, "Method for depth of field (DOE) adjustment using a combination of object segmentation and pixel binning", Research Disclosure, 2004, vol. 478, No. 97, Mason Publications.

PCT International Preliminary Report on Patentability, for PCT Application No. PCT/EP2006/007573, dated Jul. 1, 2008, 9 pages.

PCT International Preliminary Report on Patentability, for PCT Application No. PCT/EP2006/008229, dated Aug. 19, 2008, 15 pages.

PCT International Preliminary Report on Patentability, for PCT Application No. PCT/US2007/061956, dated Oct. 27, 2008, 3 pages.

PCT International Preliminary Report on Patentability, for PCT Application No. PCT/US2007/068190, dated Nov. 4, 2008, 8 pages.

PCT International Search Report and the Written Opinion of the International Searching Authority, or the Declaration for PCT application No. PCT/US2007/068190, dated Sep. 29, 2008, 10 pages.

PCT Notification of Transmittal of the International Search Report and the Written Opinion of the International Searching Authority, or the Declaration (PCT/EP2006/007573), dated Nov. 27, 2006.

PCT Notification of Transmittal of the International Search Report and the Written Opinion of the International Searching Authority, or the Declaration, for PCT Application No. PCT/EP2006/005109, 14 pages, Aug. 3, 2007.

Petschnigg, G. et al., "Digital Photography with Flash and No Flash Image Pairs", The Institution of Electrical Engineers, 2004, pp. 664-672.

Potmesil, Michael et al., "A lens and aperture camera model for synthetic image generation, ISBN:0-89791-045-1, http://portal.acm. org/citation. cfm?id=806818andcoli=GUIDEanddl=GUIDEandCFID=680-9268andCFTOKEN=82843222.", International Conference on Computer Graphics and Interactive Techniques, Proceedings of the 8th annual conference on Computer graphics and interactive techniques, 1981, pp. 297-305, ACM Press.

Sa, A. et al., "Range-Enhanced Active Foreground Extraction, XP010851333", Image Processing, IEEE International Conference, 2005, pp. 81-84.

Saito, T. et al., "Separation of irradiance and reflectance from observed color images by logarithmical nonlinear diffusion process, Ei Compendex®. Dialog® File No. 278 Accession No. 10968692", Proceedings of Society for Optical Engineering Computational Imaging IV-Electronic Imaging, 2006, vol. 6065.

Serrano, N. et al., "A computationally efficient approach to indoor/ outdoor scene classification, XP010613491, ISBN: 978-0-7695-1695-0.", Pattern Recognition, 2002 Proceedings. 16th International Conference, IEEE Comput. Soc, 2002, pp. 146-149, vol. 4.

Simard, Patrice Y. et al., "A foreground/background separation algorithm for image compression, Ei Compendex®. Dialog® File No. 278 Accession No. 9897343", Data Compression Conference Proceedings, 2004.

Sun, J. et al., "Flash Matting", ACM Transactions on Graphics, 2006, pp. 772-778, vol. 25-Issue 3.

Szummer, M. et al., "Indoor-outdoor image classification", Content-Based Access of Image and Video Database, Proceedings., IEEE International Workshop, IEEE Comput. Soc, 1998, pp. 42-51.

Television Asia, "Virtual sets and chromakey update: superimposing a foreground captured by one camera onto a background from another dates back to film days, but has come a long way since," Television Asia, vol. 13, No. 9, p. 26, Nov. 2006. Business and Industry®. Dialog® File No. 9 Accession No. 4123327.

Tzovaras, D. et al., "Three-dimensional camera motion estimation and foreground/background separation for stereoscopic image sequences, Inspec. Dialog® File No. 2 Accession No. 6556637.", Optical Engineering, 1997, pp. 574-579, vol. 36-Issue 2.

U.S. Appl. No. 10/772,767, filed Feb. 4, 2004, by inventors Michael J. DeLuca, et al.

Utpal, G. et al., "On foreground-background separation in low quality document images, Inspec. Dialog® File No. 2 Accession No. 9927003", International Journal on Document Analysis and Recognition, pp. 47-63, vol. 8-Issue 1, 2006.

Watanabe, Masahiro et al., "Rational Filters for Passive Depth from Defocus", 1995.

Yu, Jingyi et al., "Real-time reflection mapping with parallax, http// portal.acm.org/citation.cfm?id=1 053449andcoll=Portalanddl=ACMandCFID=1 7220933andCFTOKEN=89149269", Symposium on Interactive 3D Graphics, Proceedings of the 2005 symposium on Interactive 3D graphics and games, 2005, pp. 133-138, ACM Press.

FOREGROUND/BACKGROUND SEGMENTATION IN DIGITAL IMAGES

This application claims the benefit of priority under 35 USC 119 to U.S. provisional patent application No. 60/773,714, filed Feb. 14, 2006, and under 35 USC 371 to PCT application no. PCT/EP2006/008229, filed Aug. 21, 2006.

This invention related to a method of distinguishing between foreground and background regions of a digital image, known as foreground/background segmentation.

BACKGROUND

For some applications the ability to provide foreground/background separation in an image is useful. In PCT Application No. PCT/EP2006/005109 separation based on an analysis of a flash and non-flash version of an image is discussed. However, there are situations where flash and non-flash versions of an image may not provide sufficient discrimination, e.g. in bright sunlight.

Depth from de-focus is a well-known image processing technique which creates a depth map from two or more images with different focal lengths. A summary of this technique can be found at: http://homepages.inf.ed.ac.uk/rbf/CVonline/LOCAL_COPIES/FAVARO1/dfdtutorial.html. Favaro is based on a statistical analysis of radiance of two or more images—each out of focus—to determine depth of features in an image. Favaro is based on knowing that blurring of a pixel corresponds with a given Gaussian convolution kernel and so applying an inverse convolution indicates the extent of defocus of a pixel and this in turn can be used to construct a depth map. Favaro requires a dedicated approach to depth calculation once images have been acquired in that a separate radiance map must be created for each image used in depth calculations. This represents a substantial additional processing overhead compared to the existing image acquisition process.

US 2003/0052991, Hewlett-Packard, discloses for each of a series of images taken at different focus distances, building a contrast map for each pixel based on a product of the difference in pixel brightness surrounding a pixel. The greater the product of brightness differences, the more likely a pixel is considered to be in focus. The image with the greatest contrast levels for a pixel is taken to indicate the distance of the pixel from the viewfinder. This enables the camera to build a depth map for a scene. The camera application then implements a simulated fill flash based on the distance information. Here, the contrast map needs to be built especially and again represents a substantial additional processing overhead over the existing image acquisition process.

US 2004/0076335, Epson, describes a method for low depth of field image segmentation. Epson is based on knowing that sharply focussed regions contain high frequency components. US 2003/0219172, Philips, discloses calculating the sharpness of a single image according to the Kurtosis (shape of distribution) of its Discrete Cosine Transform (DCT) coefficients. US 2004/0120598, Xiao-Fan Feng, also discloses using the DCT blocks of a single image to detect blur within the image. Each of Epson, Philips and Feng is based on analysis of a single image and cannot reliably distinguish between foreground and background regions of an image.

Other prior art includes US 2003/0091225 which describes creating a depth map from two "stereo" images.

It is an object of the invention to provide an improved method of distinguishing between foreground and background regions of a digital image.

DESCRIPTION OF THE INVENTION

According to a first aspect of the present invention there is provided a method of distinguishing between foreground and background regions of a digital image of a scene, the method comprising capturing first and second images of nominally the same scene and storing the captured images in DCT-coded format, the first image being taken with the foreground more in focus than the background and the second image being taken with the background more in focus than the foreground, and assigning regions of the first image as foreground or background according to whether the sum of selected higher order DCT coefficients decreases or increases for the equivalent regions of the second image.

In the present context respective regions of two images of nominally the same scene are said to be equivalent if, in the case where the two images have the same resolution, the two regions correspond to substantially the same part of the scene or if, in the case where one image has a greater resolution than the other image, the part of the scene corresponding to the region of the higher resolution image is substantially wholly contained within the part of the scene corresponding to the region of the lower resolution image.

If the two images are not substantially identical, due, for example, to slight camera movement, an additional stage of aligning the two images may be required.

Preferably, where the first and second images are captured by a digital camera, the first image is a relatively high resolution image, and the second image is a relatively low resolution pre- or post-view version of the first image.

When the image is captured by a digital camera, the processing may be done in the camera as a post processing stage, i.e. after the main image has been stored, or as a post processing stage externally in a separate device such as a personal computer or a server computer. In the former case, the two DCT-coded images can be stored in volatile memory in the camera only for as long as they are needed for foreground/background segmentation and final image production. In the latter case, however, both images are preferably stored in non-volatile memory. In the case where a lower resolution pre- or post-view image is used, the lower resolution image may be stored as part of the file header of the higher resolution image.

In some cases only selected regions of the two images need to be compared. For example, if it is known that the images contain a face, as determined, for example, by a face detection algorithm, the present technique can be used just on the region including and surrounding the face to increase the accuracy of delimiting the face from the background.

The present invention uses the inherent frequency information which DCT blocks provide and takes the sum of higher order DCT coefficients for a DCT block as an indicator of whether a block is in focus or not. Blocks whose higher order frequency coefficients drop when the main subject moves out of focus are taken to be foreground with the remaining blocks representing background or border areas. Since the image acquisition and storage process in a conventional digital camera codes the captured images in DCT format as an intermediate step of the process, the present invention can be implemented in such cameras without substantial additional processing.

This technique is useful in cases where the differentiation created by camera flash, as described in PCT Application No. PCT/EP2006/005109, may not be sufficient. The two techniques may also be advantageously combined to supplement one another.

The method of the invention lends itself to efficient in-camera implementation due to the relatively simple nature of calculations needed to perform the task.

In a second aspect of the invention, there is provided a method of determining an orientation of an image relative to a digital image acquisition device based on a foreground/background analysis of two or more images of a scene.

BRIEF DESCRIPTION OF DRAWINGS

Embodiments of the invention will now be described, by way of example, with reference to the accompanying drawings, in which.

DESCRIPTION OF PREFERRED EMBODIMENTS

Figure 1:
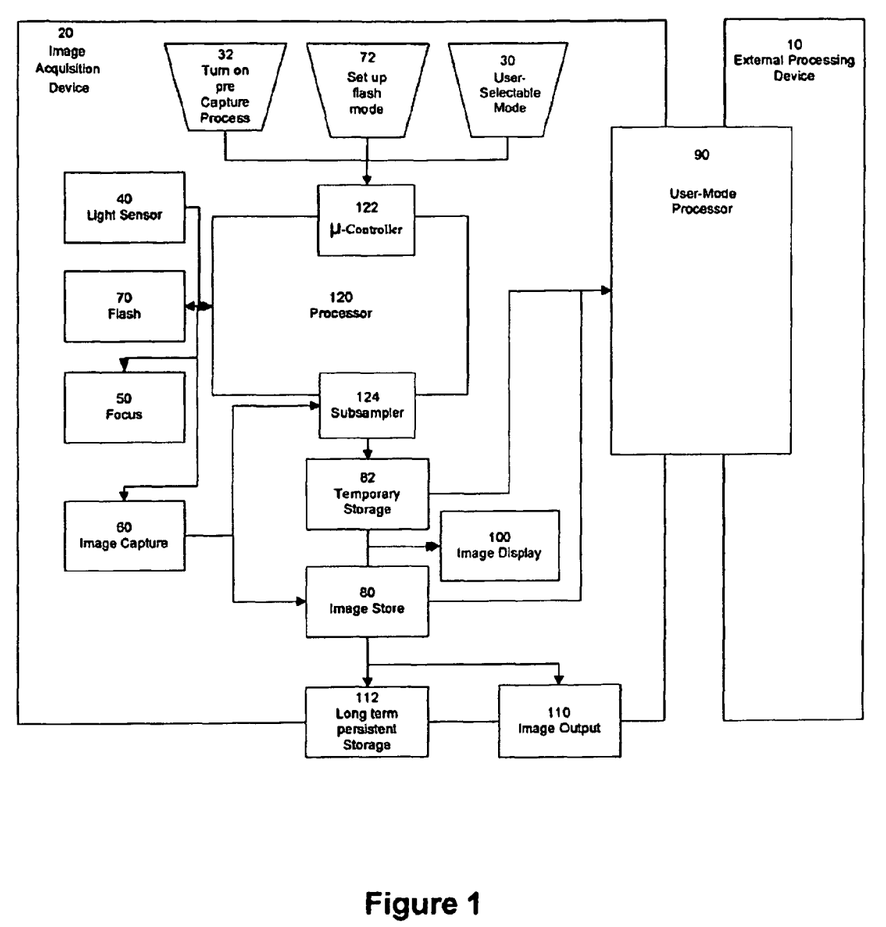
FIG. 1 is a block diagram of a camera apparatus operating in accordance with embodiments of the present invention.

FIG. 1 shows a block diagram of an image acquisition device 20 operating in accordance with embodiments of the present invention. The digital acquisition device 20, which in the present embodiment is a portable digital camera, includes a processor 120. It can be appreciated that many of the processes implemented in the digital camera may be implemented in or controlled by software operating in a microprocessor, central processing unit, controller, digital signal processor and/or an application specific integrated circuit, collectively depicted as block 120 labelled "processor". Generically, all user interface and control of peripheral components such as buttons and display is controlled by a microcontroller 122. The processor 120, in response to a user input at 122, such as half pressing a shutter button (pre-capture mode 32), initiates and controls the digital photographic process. Ambient light exposure is determined using a light sensor 40 in order to automatically determine if a flash is to be used. The distance to the subject is determined using a focusing mechanism 50 which also focuses the image on an image capture device 60. If a flash is to be used, processor 120 causes a flash device 70 to generate a photographic flash in substantial coincidence with the recording of the image by the image capture device 60 upon full depression of the shutter button. The image capture device 60 digitally records the image in colour. The image capture device is known to those familiar with the art and may include a CCD (charge coupled device) or CMOS to facilitate digital recording. The flash may be selectively generated either in response to the light sensor 40 or a manual input 72 from the user of the camera. The high resolution image recorded by image capture device 60 is stored in an image store 80 which may comprise computer memory such a dynamic random access memory or a non-volatile memory. The camera is equipped with a display 100, such as an LCD, for preview and post-view of images.

In the case of preview images which are generated in the pre-capture mode 32 with the shutter button half-pressed, the display 100 can assist the user in composing the image, as well as being used to determine focusing and exposure. Temporary storage 82 is used to store one or plurality of the preview images and can be part of the image store 80 or a separate component. The preview image is usually generated by the image capture device 60. For speed and memory efficiency reasons, preview images usually have a lower pixel resolution than the main image taken when the shutter button is fully depressed, and are generated by subsampling a raw captured image using software 124 which can be part of the general processor 120 or dedicated hardware or combination thereof. Depending on the settings of this hardware subsystem, the pre-acquisition image processing may satisfy some predetermined test criteria prior to storing a preview image. Such test criteria may be chronological, such as to constantly replace the previous saved preview image with a new captured preview image every 0.5 seconds during the pre-capture mode 32, until the final high resolution image is captured by full depression of the shutter button. More sophisticated criteria may involve analysis of the of the preview image content, for example, testing the image for changes, before deciding whether the new preview image should replace a previously saved image. Other criteria may be based on image analysis such as the sharpness, or metadata analysis such as the exposure condition, whether a flash will be used for the final image, the estimated distance to the subject, etc.

If test criteria are not met, the camera continues by capturing the next preview image while discarding preceding captured preview image. The process continues until the final high resolution image is acquired and saved by fully depressing the shutter button.

Where multiple preview images can be saved, a new preview image will be placed on a chronological First In First Out (FIFO) stack, until the user takes the final picture. The reason for storing multiple preview images is that the last preview image, or any single preview image, may not be the best reference image for comparison with the final high resolution image in, for example, a red-eye correction process or, in the present embodiments, portrait mode processing. By storing multiple images, a better reference image can be achieved, and a closer alignment between the preview and the final captured image can be achieved in an alignment stage discussed later.

The camera is also able to capture and store in the temporary storage 82 one or more low resolution post-view images when the camera is in portrait mode, as will be to be described. Post-view images are essentially the same as preview images, except that they occur after the main high resolution image is captured.

In this embodiment the camera 20 has a user-selectable mode 30. The user mode 30 is one which requires foreground/background segmentation of an image as part of a larger process, e.g. for applying special effects filters to the image or for modifying or correcting an image. Thus in the user mode 30 the foreground/background segmentation is not an end in itself; however, only the segmentation aspects of the mode 30 are relevant to the invention and accordingly only those aspects are described herein.

If user mode 30 is selected, when the shutter button is depressed the camera is caused to automatically capture and store a series of images at close intervals so that the images are nominally of the same scene. The particular number, resolution and sequence of images, and the extent to which different parts of the image are in or out of focus, depends upon the particular embodiment, as will be described. A user mode processor 90 analyzes and processes the stored images according to a workflow to be described. The processor 90 can be integral to the camera 20—indeed, it could be the processor 120 with suitable programming—or part of an external processing device 10 such as a desktop computer. In this embodiment the processor 90 processes the captured images in DCT format. As explained above, the image acquisition and storage process in a conventional digital camera codes and temporarily stored the captured images in DCT format as an intermediate step of the process, the images being finally stored in, for example, jpg format. Therefore, the intermediate DCT-coded images can be readily made available to the processor 90.

Figure 2:
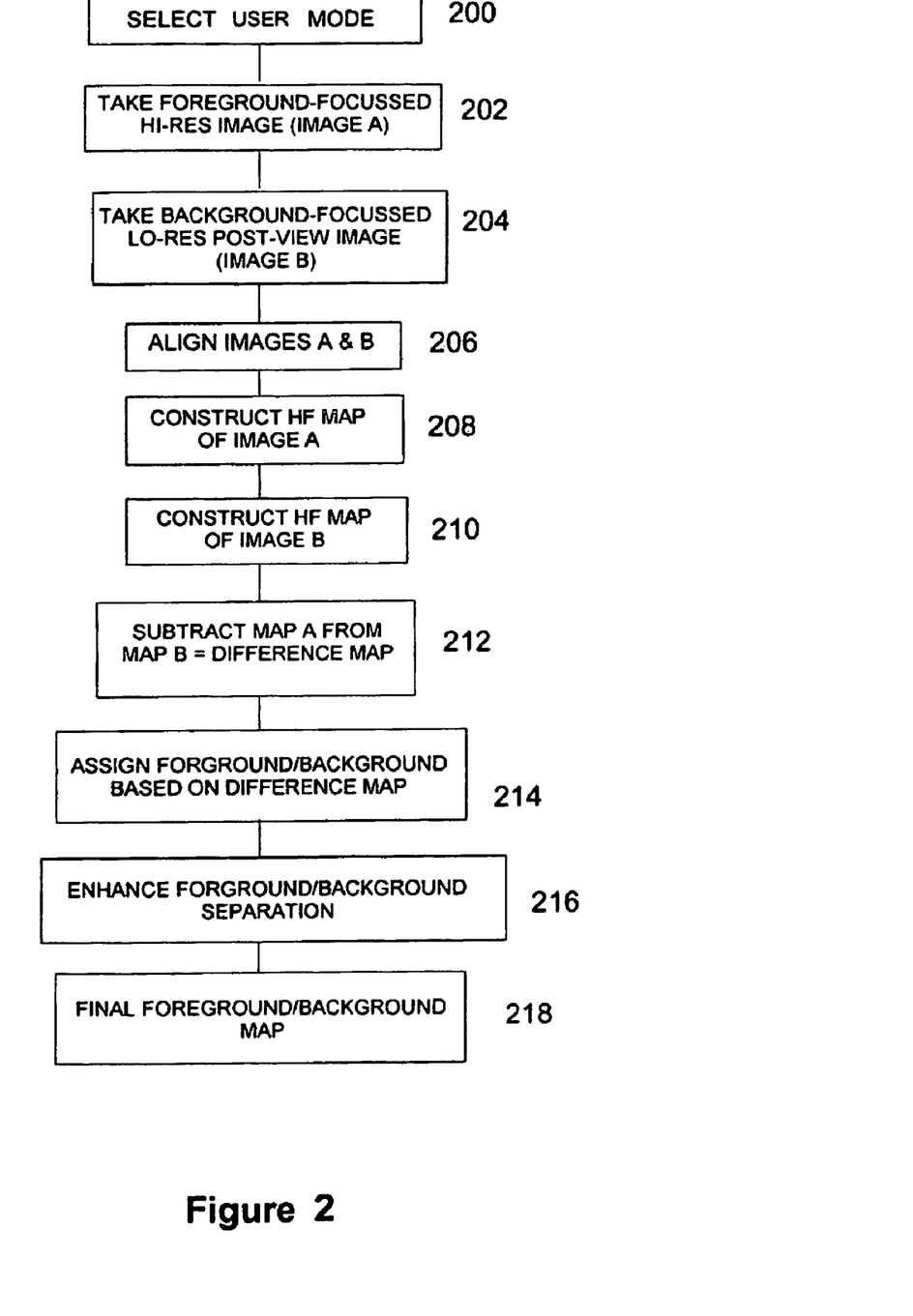
FIG. 2 shows the workflow of a method according to an embodiment of the invention.

FIG. 2 illustrates the workflow of an embodiment of user mode processing according to the invention.

First, user mode 30 is selected, step 200. Now, when the shutter button is fully depressed, the camera automatically captures and stores two digital images in DCT format:

- a high pixel resolution image (image A), step 202. This image has a foreground subject of interest which is in focus, or at least substantially more in focus than the background.
- a low pixel resolution post-view image (image B), step 204. This image has its background in focus, or at least substantially more in focus than the foreground subject of interest. Auto-focus algorithms in a digital camera will typically provide support for off-centre multi-point focus which can be used to obtain a good focus on the background. Where such support is not available, the camera can be focussed at infinity.

These two images are taken in rapid succession so that the scene captured by each image is nominally the same.

In this embodiment steps 200 to 206 just described necessarily take place in the camera 20. The remaining steps now to be described can take place in the camera or in an external device 10.

Images A and B are aligned in step 206, to compensate for any slight movement in the subject or camera between taking these images. Alignment algorithms are well known. Then, step 208, a high frequency (HF) map of the foreground focussed image A is constructed by taking the sum of selected higher order DCT coefficients for each, or at least the majority of, the DCT blocks of the image. By way of background, for an 8×8 block of pixels, a set of 64 DCT coefficients going from the first (d.c.) component to the highest frequency component is generated. In this embodiment, the top 25% of the DCT coefficients for a block are added to provide an overall HF index for the block. If not all the DCT blocks of the image are used to construct the map, those that are should be concentrated on the regions expected to contain the foreground subject of interest. For example, the extreme edges of the image can often be omitted, since they will almost always be background. The resultant map is referred to herein as Map A.

Next, step 210, an HF map (Map B) of the background focussed image 13 is constructed by calculating the HF indices of the DCT blocks using the same procedure as for Map A.

Now, step 212, a difference map is constructed by subtracting Map A from Map B. This is done by subtracting the HF indices obtained in step 208 individually from the HF indices obtained in step 210. Since Image A has a higher pixel resolution than image B, a DCT block in Image B will correspond to a larger area of the scene than a DCT block in Image A. Therefore, each HF index of Map A is subtracted from that HF index of Map B whose DCT block corresponds to an area of the scene containing or, allowing for any slight movement in the subject or camera between taking the images, substantially containing the area of the scene corresponding to the DCT block of Map A. This means that the HF indices for several adjacent DCT blocks in Image A will be subtracted from the same HF index of Map B, corresponding to a single DCT block in Image B.

At step 214, using the values in the difference map, a digital foreground/background map is constructed wherein each DCT block of Image A is assigned as corresponding to a foreground or background region of the image according to whether the difference between its HF index and the HF index of the DCT block of Image B from which it was subtracted in step 212 is respectively negative or positive.

Finally, step 216, additional morphological, region filling and related image processing techniques, alone or combination with other foreground/background segmentation techniques, can further improve and enhance the final foreground/background map.

The final foreground/background map 218 may now be applied to the DCT-coded or jpg version of Image A for use in processing the image according to the function to be performed by the user-selectable mode 30.

Where the processor 90 is integral to the camera 20, the final processed jpg image may be displayed on image display 100, saved on a persistent storage 112 which can be internal or a removable storage such as CF card, SD card or the like, or downloaded to another device, such as a personal computer, server or printer via image output device 110 which can be tethered or wireless. In embodiments where the processor 90 is implemented in an external device 10, such as a desktop computer, the final processed image may be returned to the camera 20 for storage and display as described above, or stored and displayed externally of the camera.

Variations of the foregoing embodiment are possible. For example, Image B could be a low resolution preview image rather than a post-view image. Alternatively, both Images A and B could be high resolution images having the same resolution. In that case a DCT block in Image B will correspond to the same area of the scene as a DCT block in Image A. Thus, in step 212, the difference map would be constructed by subtracting each HF index of Map A from a respective different HF index of Map B, i.e. that HF index of Map B corresponding to the same or, allowing for any slight movement in the subject or camera between taking the images, substantially the same area of the scene. In another embodiment both Images A and B are low resolution preview and/or post-view images having the same resolution, and the foreground/background map derived therefrom is applied to a third, higher resolution image of nominally the same scene. In a still further embodiment Images A and B have different pixel resolutions, and prior to DCT coding the pixel resolutions of the two images are matched by up-sampling the image of lower resolution and/or sub-sampling the image of higher resolution.

Although the embodiment described above contemplates the creation and storage of a digital foreground/background map, it may be possible to use the foreground/background designation of the image region corresponding to each DCT block directly in another algorithm, so that the formal creation and storage of a digital map is not necessary.

In another embodiment, rather than basing the maps and comparison on a DCT block by block analysis, each map can first be pre-processed to provide regions, each having similar HF characteristics. For example, contiguous blocks with HF components above a given threshold are grouped together and contiguous blocks with HF components below a given threshold are grouped together. Regions from the foreground and background images can then be compared to determine if they are foreground or background.

As mentioned above, the ability to provide foreground/background separation in an image is useful in many applications.

In a further aspect of the present invention, a particular application using a foreground/background map of an image, regardless of whether it has been calculated using the embodiment described above or for example using the flash-based technique of PCT/EP2006/005109, is to detect the orientation of an image relative to the camera. (The technique is of course applicable to any digital image acquisition device.) For most situations, this also implies the orientation of the camera when the image was taken without the need for an additional mechanical device.

Figure 3:
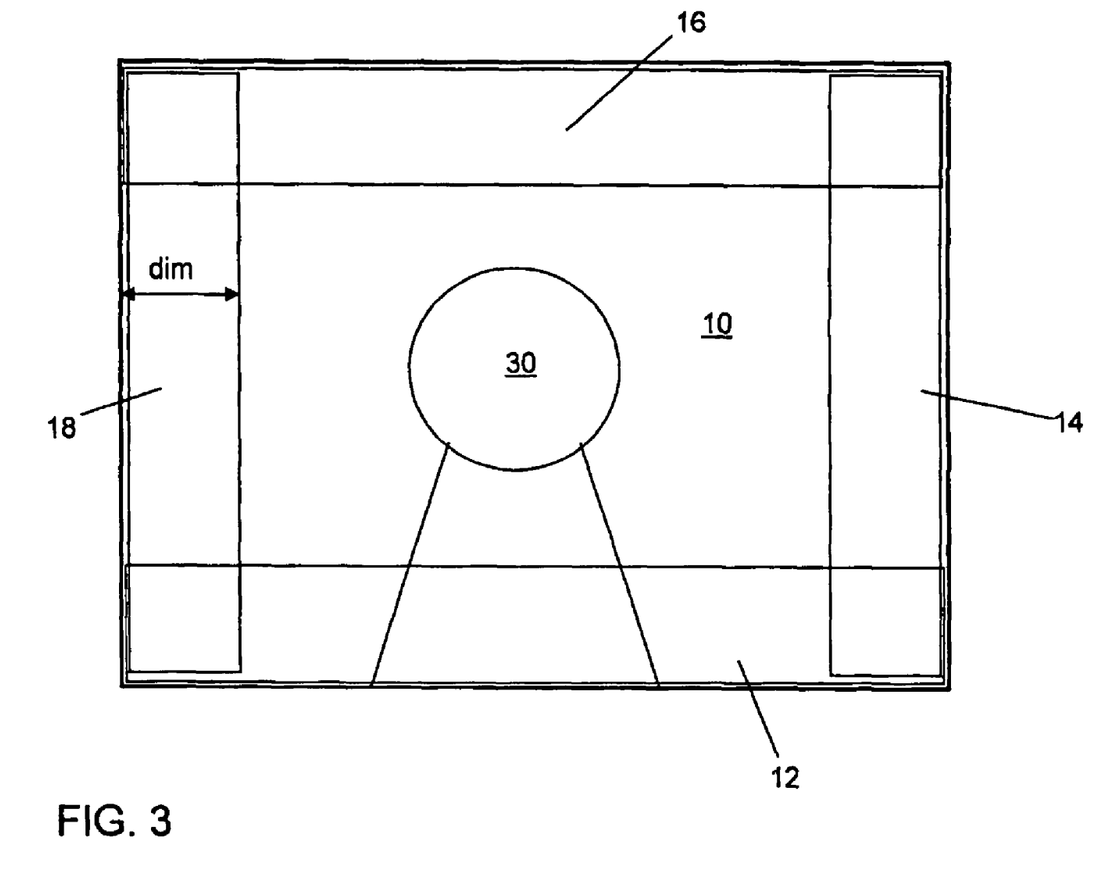
FIG. 3 shows a foreground/background map for a portrait image.

Referring to FIG. 3, this aspect of the invention is based on the observation that in a normally oriented camera for a normally oriented scene, the close image foreground (in this case the subject 30) is at the bottom of the image and the far background is at its top.

Using flash-based foreground/background segmentation, being closer to the camera, the close foreground 30 reflects the flash more than the far background. Thus, by computing the difference between a flash and non-flash version image of the scene, the image orientation can be detected and camera orientation implied. (A corresponding analysis applies when analysing the DCT coefficients of two images as in the above described embodiment.)

An exemplary implementation uses 2 reference images (or preview images or combination of previous and main image suitably matched in resolution), one flash and one non-flash and transforms these into grey level.

For each pixel, the grey level of the non-flash image is subtracted from the one corresponding to the flash image to provide a difference image. In other implementations, a ratio could be used instead of subtraction.

For each potential image/camera orientation direction, a box is taken in the difference image. So for an image sensing array 10 in an upright camera, box 12 is associated with an upright orientation of the camera, box 16 with an inverted orientation of the camera, box 14 with a clockwise rotation of the camera relative to a scene and box 18 with an anti-clockwise rotation of the camera relative to the scene.

For each box 12-18, an average value of the difference image is computed. As such, it will be seen that in some implementations, the difference need only be calculated for portions of the image corresponding to the boxes 12-18.

For clarity, the boxes of FIG. 3 are not shown as extending to the edges of the image, however, in an exemplary implementation, for a box size=dim, the box 18 would extend from: left=0, top=0 to right=dim and bottom=image height. In other implementations, one could associate other suitable regions with a given orientation or indeed other units of measurement instead of the average (i.e. histograms).

The maximum of the average values for the boxes 12-18 is computed and the box corresponding to the largest value is deemed to be a region with the greatest degree of foreground vis-a-vis the remaining regions. This is deemed to indicate that this region lies at the bottom of the reference image(s). In the example of FIG. 3, the largest difference in the difference images of the boxes should occur in box 12, so indicating an upright subject and implying an upright camera orientation given the normal pose of a subject. In some implementations the box 16 need not be used as it is not a realistic in-camera orientation.

In some implementations it can be of benefit to run some tests in order to validate the presumptive image orientation. For example, the maximum of the average values is tested to determine if is dominant vis-a-vis the other values and a level of confidence can be implied from this dominance or otherwise. The degree of dominance required can be varied experimentally for different types of images (indoor/outdoor as described in PCT/EP2006/005109, day/night). Information from other image analysis components which are used within the camera may be combined in this step for determining level of confidence. One exemplary image analysis component is a face tracking module which is operable on a stream of preview images. This component stores historical data relating to tracked face regions, including a confidence level that a region is a face and an associated orientation. Where multiple faces are present their data may be combined in determining a level of confidence.

If the difference values for the presumed left and right sides of an image are similar and smaller then the presumed bottom and larger than the presumed top, then it is more likely that the orientation has been detected correctly.

Because foreground/background maps can be provided for both indoor and outdoor images according to whether the maps have been created using flash or non-flash based segmentation, knowing image orientation can be useful in many further camera applications. For example, knowing the likely orientation of objects in an image reduces the processing overhead of attempting to identify such objects in every possible orientation.

The invention is not limited to the embodiments described herein which may be modified or varied without departing from the scope of the invention.

What is claimed is:

1. A method of distinguishing between foreground and background regions of a digital image of a scene, the method comprising: capturing first and second images of nominally the same scene, the first image being taken with the foreground more in focus than the background and the second image being taken with the background more in focus than the foreground; storing the captured images in DCT-coded format; assigning regions of the first image as foreground or background according to whether a difference between sums of selected higher order DCT coefficients for the first and second images is positive or negative; and rendering in accordance with the assigning one or more processed images based on the first image or the second image, or both, at a digital rendering device, display or printer, or combinations thereof.

2. The method of claim 1, wherein regions are assigned as foreground when the difference is negative and as background when the difference is positive.

3. The method of claim 1, wherein the assigning further comprises: (i) calculating the sum of selected high order coefficients for a plurality of DCT blocks of the first image, (ii) calculating the sum of the same high order coefficients for a plurality of DCT blocks of the second image, (iii) comparing the sum calculated in step (i) for each DCT block of the first image with the sum calculated in step (ii) for the DCT block of the equivalent region of the second image, (iv) if the difference between the sums calculated for the first and second images is negative, assigning the given block as corresponding to a foreground region of the image, and (v) if the difference between the sums calculated for the first and second images is positive, assigning that block as corresponding to a background region of the image.

4. The method of claim 3, further comprising aligning said first and second images.

5. The method of claim 3, further comprising creating a digital map from said assigning said blocks as corresponding to background or foreground.

6. The method of claim 3, wherein the first and second images have different pixel resolutions.

7. The method of claim 6, further comprising making the image resolution of said first and second images equal.

8. The method of claim 6, wherein the first and second images are captured by a digital camera.

9. The method of claim 8, wherein the first image is a relatively high resolution image, and wherein the second image is a relatively low resolution pre- or post-view version of the first image.

10. The method of claim 8, wherein said calculating and comparing is performed as a post processing stage in an external device to said digital camera.

11. The method of claim 8, wherein said calculating and comparing is performed as a post processing stage in said digital camera.

12. The method of claim 3, wherein the first and second images have the same pixel resolution, and wherein the first and second images are captured by a digital camera and are relatively low resolution pre- and/or post-view versions of a higher resolution image of said scene also captured by the camera.

13. The method of claim 3, wherein the selected high order coefficients are the top 25% of coefficients.

14. An image acquisition apparatus, comprising: including an imaging optical system; and a digital image detector; a processor; and a non-transitory, processor-readable storage medium having stored therein program instructions for programming the processor to perform a method of distinguishing between foreground and background regions of a digital image of a scene, wherein the program instructions stored in the storage medium are configured to program the apparatus to capture first and second images of nominally the same scene, the first image being taken with the foreground more in focus than the background and the second image being taken with the background more in focus than the foreground; and to store the captured images in DCT-coded format; and to assign one or more regions of one or both of the first and second images as foreground or background according to whether a difference between sums of selected higher order DCT coefficients for the first and second images is positive or negative.

15. The apparatus of claim 14, wherein the program instructions stored in the storage medium are configured to program the apparatus to create a digital map from said assigning said blocks as corresponding to background or foreground.

16. The apparatus of claim 14, wherein the program instructions stored in the storage medium are configured to program the apparatus to make the image resolution of said first and second images equal.

17. The apparatus of claim 14, wherein the program instructions stored in the storage medium are configured to program the apparatus to capture first and second images of nominally the same scene and to store the captured images in DCT-coded format, the first image being taken with the foreground more in focus than the background and the second image being taken with the background more in focus than the foreground, and to assign regions of the first image as foreground or background according to whether a difference between sums of selected higher order DCT coefficients for the first and second images is positive or negative.

18. The apparatus of claim 14, wherein regions are assigned as foreground when the difference is negative and as background when the difference is positive.

19. The apparatus of claim 14, wherein the processor-readable code configured to program the apparatus to assign is configured to program the apparatus to (i) calculate the sum of selected high order coefficients for a plurality of DCT blocks of the first image, and to (ii) calculating the sum of the same high order coefficients for a plurality of DCT blocks of the second image, and to (iii) compare the sum calculated in (i) for each DCT block of the first image with the sum calculated in (ii) for the DCT block of the equivalent region of the second image, (iv) if the difference between the sums calculated for the first and second images is negative, then the processor-readable code is configured to program the apparatus to assign the given block as corresponding to a foreground region of the image, and (v) if the difference between the sums calculated for the first and second images is positive, then the processor-readable code is configured to program the apparatus to assign that block as corresponding to a background region of the image.

20. The apparatus of claim 19, wherein the program instructions stored in the storage medium are configured to program the apparatus to align said first and second images.

21. The apparatus of claim 19, wherein the first and second images have different pixel resolutions.

22. The apparatus of claim 19, wherein the first and second images are captured by a digital camera.

23. The apparatus of claim 22, wherein the first image is a relatively high resolution image, and wherein the second image is a relatively low resolution pre- or post-view version of the first image.

24. The apparatus of claim 22, wherein said calculating and comparing is performed as a post processing stage in an external device to said digital camera.

25. The apparatus of claim 22, wherein said calculating and comparing is performed as a post processing stage in said digital camera.

26. The apparatus of claim 14, wherein the first and second images have the same pixel resolution, and wherein the first and second images are captured by a digital camera and are relatively low resolution pre- and/or post-view versions of a higher resolution image of said scene also captured by the camera.

27. The apparatus of claim 14, wherein the selected high order coefficients are the top 25% of coefficients.

28. One or more non-transitory processor readable storage devices having processor readable code embodied thereon, said processor readable code for programming one or more processors to perform a method of distinguishing between foreground and background regions of a digital image of a scene, wherein the processor-readable code is configured to program the one or more processors to capture first and second images of nominally the same scene, the first image being taken with the foreground more in focus than the background and the second image being taken with the background more in focus than the foreground; and to store the captured images in DCT-coded format; and to assign regions of one or both of the first and second image as foreground or background according to whether a difference between one or more selected higher order DCT coefficients for equivalent regions of the first and second image is positive or negative.

29. The one or more storage devices of claim 28, wherein the processor-readable code is configured to program the one or more processors to create a digital map from said assigning said blocks as corresponding to background or foreground.

30. The one or more storage devices of claim 28, wherein the processor-readable code is configured to program the one or more processors to align the first and second images.

31. The one or more storage devices of claim 28, wherein regions are assigned as foreground when the difference is negative and as background when the difference is positive.

32. The one or more storage devices of claim 28, wherein the processor-readable code configured to program the one or more processors to assign is configured to program the one or more processors to (i) calculate the sum of selected high order coefficients for a plurality of DCT blocks of the first image, and to (ii) calculating the sum of the same high order coefficients for a plurality of DCT blocks of the second image, and to (iii) compare the sum calculated in (i) for each DCT block of the first image with the sum calculated in (ii) for the DCT block of the equivalent region of the second image, (iv) if the difference between the sums calculated for the first and second images is negative, assigning the given block as corresponding to a foreground region of the image, and (v) if the difference between the sums calculated for the first and second images is positive, assigning that block as corresponding to a background region of the image.

33. The one or more storage devices of claim 32, wherein the first and second images have different pixel resolutions.

34. The one or more storage devices of claim 33, wherein the processor-readable code is configure to program the one or more processors to make the image resolution of said first and second images equal.

35. The one or more storage devices of claim 32, wherein the first and second images are captured by a digital camera.

36. The one or more storage devices of claim 35, wherein the first image is a relatively high resolution image, and wherein the second image is a relatively low resolution pre- or post-view version of the first image.

37. The one or more storage devices of claim 35, wherein the processor-readable code is configured to program the one or more processors to calculate and compare as a post processing stage in an external device to said digital camera.

38. The one or more storage devices of claim 35, wherein the processor-readable code is configured to program the one or more processors to calculate and compare as a post processing stage in said digital camera.

39. The one or more storage devices of claim 32, wherein the first and second images have the same pixel resolution, and wherein the first and second images are captured by a digital camera and are relatively low resolution pre- and/or post-view versions of a higher resolution image of said scene also captured by the camera.

40. The one or more storage devices of claim 32, wherein the selected high order coefficients comprise the top 25% of coefficients.

* * * * *